UNITED STATES PATENT OFFICE.

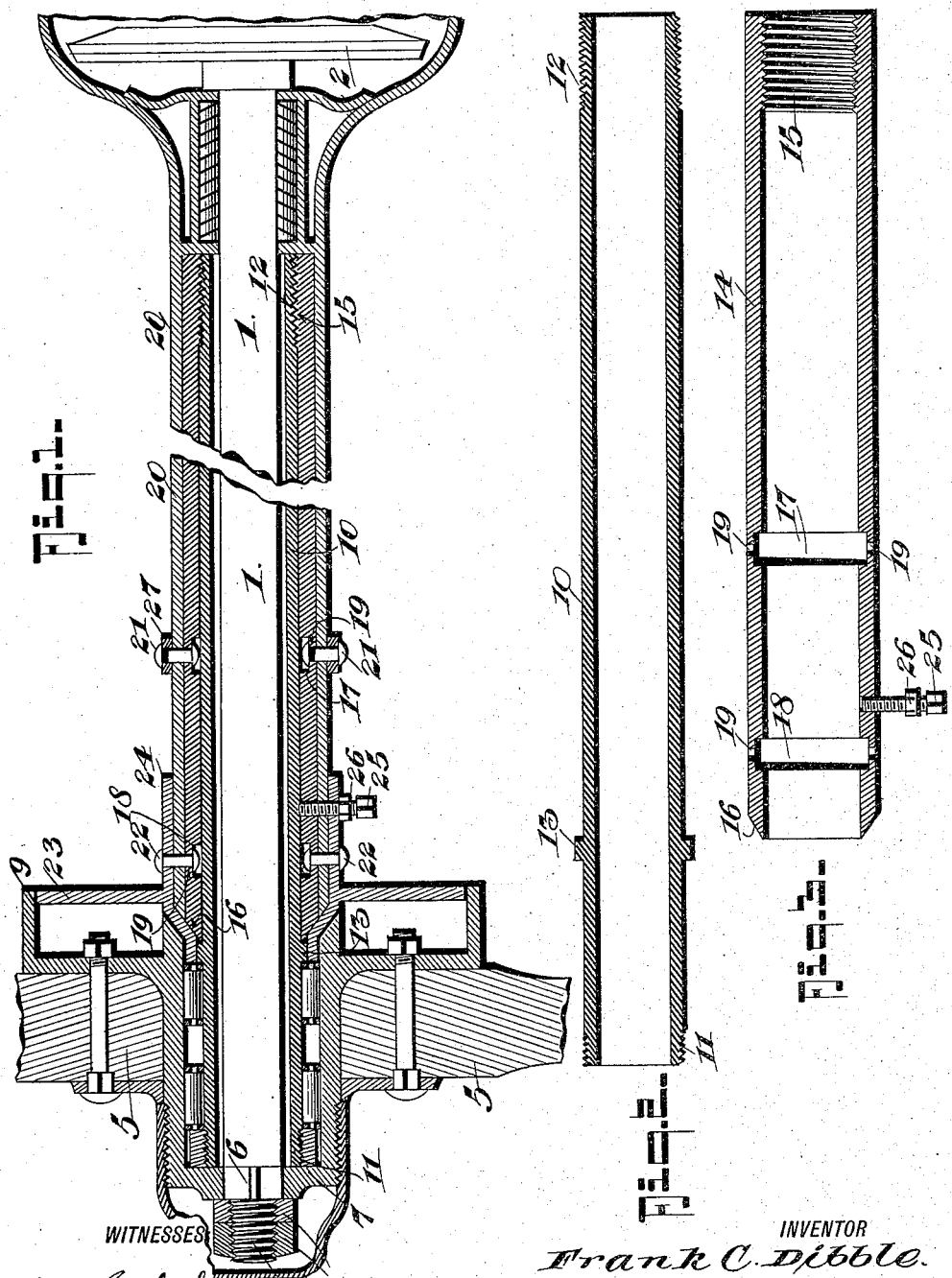

FRANK C. DIBBLE, OF HARNEY COUNTY, OREGON.

AXLE-HOUSING.

1,171,182. Specification of Letters Patent. Patented Feb. 8, 1916.

Application filed September 30, 1915. Serial No. 53,351.

*To all whom it may concern:*

Be it known that I, FRANK C. DIBBLE, a citizen of the United States, and a resident of Harney county and State of Oregon, have invented a new and useful Improvement in Axle-Housings, of which the following is a specification.

My invention is an improvement in axle housings, and the invention has for its object to provide a housing of the character specified, so arranged that in case of breakage of a spindle, the broken spindle may be detached and removed and replaced by a new spindle in a minimum of time with the ordinary tools carried by the driver, and without expert attention and without the necessity of providing a new housing for the axle, thus eliminating a large item of expense, a considerable loss of time, and delay and loss of use of the vehicle.

In the drawings:—Figure 1 is a longitudinal vertical section through a portion of the axle and housing, Fig. 2 is a longitudinal section of the spindle detached, and Fig. 3 is a similar view of the sleeve detached.

In the present embodiment of the invention, the axle section 1 is provided at its inner end with the usual bevel gearing 2, forming a part of the differential, and at its outer end with a reduced screw threaded portion 3, for engagement by the nuts 4, which hold the wheel 5 in place on the axle. The axle also has a polygonal portion 6 between the threaded portion and the body of the axle for engaging the hub 7 of the wheel to constrain the wheel to rotate with the axle, and the usual dust cap 8 is threaded on to the outer end of the hub inclosing the reduced portion 3, and the nuts 4. The wheel carries the usual brake disk 9, which is an integral portion of the hub.

The spindle as shown in Fig. 2, is a sleeve or tubular casing 10, having its ends externally threaded as shown at 11 and 12, respectively, and an annular shoulder or rib 13 is provided on the exterior of the sleeve near the threaded end 11. The spindle 10 fits over the axle loosely as shown, and a sleeve 14 having one end internally threaded as indicated at 15 fits over the inner end of the spindle. The threaded portion 12 of the spindle engages the threaded portion 15 of the sleeve, thus rigidly connecting the spindle to the sleeve but permitting the spindle to be detached by turning the same in the proper direction. The outer end of the sleeve 14 is beveled externally as indicated at 16, and the said sleeve is provided with internal annular grooves 17 and 18 near the bevel end, and with openings 19 leading from the said grooves radially. The housing 20 for the axle fits outside of the sleeve 14 closely, and is secured to the sleeve by means of rivets 21 and 22. The inner heads of these rivets 21 and 22 are received in the annular grooves 17 and 18, respectively, and a collar 27 encircles the housing at the rivets 21, the said rivets passing through the collar and being headed outside of the collar.

The brake drum 23 is secured to the housing and the spindle by means of the rivets 22, the said drum having the usual drum portion 24, which fits over the housing, and the rivets 22 are passed through this drum portion. A set screw 25 is threaded through the drum portion 24, the housing 20, the sleeve 14, and into engagement with the spindle 10 for locking the spindle to the sleeve and the housing, and a lock nut 26 is threaded on to the set screw for holding it in place, and for preventing accidental disengagement thereof.

In use, should the spindle become broken or should it be necessary to remove the same for any reason, it is only necessary to release the set screw 25 and to turn the spindle out from its position within the sleeve 10. A new spindle may be inserted and threaded into place after which the set screw 25 is tightened. The entire change of spindles can be made within a very short time and without the use of any other tools than those usually carried by the driver. The sleeve 14 at its outer end abuts against the rib 13 as shown in Fig. 1.

I claim:—

1. In combination with the rear axle and the housing therefor, of a sleeve held within the housing and riveted thereto, said sleeve being internally threaded at its inner end, a hollow spindle externally threaded at its ends, one of the threaded portions engaging the internally threaded portion of the sleeve, and a set screw having a lock nut threaded through the sleeve into engagement with the spindle, said sleeve having internal annular grooves, and rivets connecting the sleeve to the housing, the heads of the rivets engaging the grooves, said spindle having an annular rib at the outer end of the sleeve against which the sleeve abuts.

2. In combination with the rear axle and the housing therefor, of a sleeve held within the housing and riveted thereto, said sleeve being internally threaded at its inner end, a hollow spindle externally threaded at its ends, one of the threaded portions engaging the internally threaded portion of the sleeve, and a set screw having a lock nut threaded through the sleeve into engagement with the spindle, said sleeve having internal annular grooves, and rivets connecting the sleeve to the housing, the heads of the rivets engaging the grooves.

3. In combination with the rear axle and the housing therefor, of a sleeve held within the housing and riveted thereto, said sleeve being internally threaded at its inner end, a hollow spindle externally threaded at its ends, one of the threaded portions engaging the internally threaded portion of the sleeve, and a set screw having a lock nut threaded through the sleeve into engagement with the spindle.

4. In combination with the rear axle and the housing therefor, of a sleeve rigidly connected with the housing and internally threaded at its inner end, a hollow spindle inclosing the axle, and having a threaded engagement with the sleeve at the inner ends of the sleeve and spindle, and means for detachably connecting the outer end of the sleeve to the spindle.

FRANK C. DIBBLE.

Witnesses:
C. H. VOEGTLY,
W. E. BRINGLE.

Copies of this patent may be obtained for five cents each, by addressing the "Commissioner of Patents, Washington, D. C."